United States Patent [19]

Guskov et al.

[11] Patent Number: 4,848,720
[45] Date of Patent: Jul. 18, 1989

[54] DEVICE FOR PRODUCING ANNULAR-SHAPED POLYMER ARTICLES

[76] Inventors: Valery V. Guskov, ulitsa Kulman, I3, kv. I9; Vladimir P. Boikov, ulitsa Ya.Kolasa, I39, kv. I72, both of Minsk; Viktor A. Moroz, ulitsa Kuibysheva, 8a, kv. 24, Bobruisk; Gennady G. Kozachevsky, ulitsa Yakubovskogo, kor. 2, I8, kv. 27I, Minsk; Jury N. Gorodnichev, ulitsa Gertsena, 37, korpus I, kv. 72, Moscow, all of U.S.S.R.

[21] Appl. No.: 130,536
[22] PCT Filed: Jan. 24, 1986
[86] PCT No.: PCT/SU86/00003
§ 371 Date: Sep. 23, 1987
§ 102(e) Date: Sep. 23, 1987
[87] PCT Pub. No.: WO87/04386
PCT Pub. Date: Jul. 30, 1987

[51] Int. Cl.⁴ .............................................. B28B 17/30
[52] U.S. Cl. .................................... 249/178; 425/417; 156/420

[58] Field of Search ................ 425/417; 156/414, 417, 156/420; 249/152, 178

[56] References Cited

FOREIGN PATENT DOCUMENTS 1704905  5/1971  Fed. Rep. of Germany.
 882776 11/1981  U.S.S.R. .
1087358  4/1984  U.S.S.R. .
1286068  8/1972  United Kingdom .

Primary Examiner—Bernard Nozick
Attorney, Agent, or Firm—Lilling & Greenspan

[57] ABSTRACT

A device for producing annular-shaped articles comprises a hub (4) and a cylinder-shaped body (1) made up of sectors (2 and 3), of which the sectors (2) are rigidly coupled to the hub (4), while the other sectors (3) are traversable with respect to the hub, a pusher (6) being axially arranged in the hub (4) and adapted to interact, while axially moving, through its ends extending towards the other sectors (3), with stops (8) secured on the other sectors (3) for traversing the latter with respect to the hub (4). The stops (8) are held to the other sectors (3) at angles ($\alpha$) less than 90 degrees with the direction of movement performed by the pusher (6) when the other sectors (3) are being brought together.

2 Claims, 2 Drawing Sheets

U.S. Patent  Jul. 18, 1989  Sheet 1 of 2  4,848,720
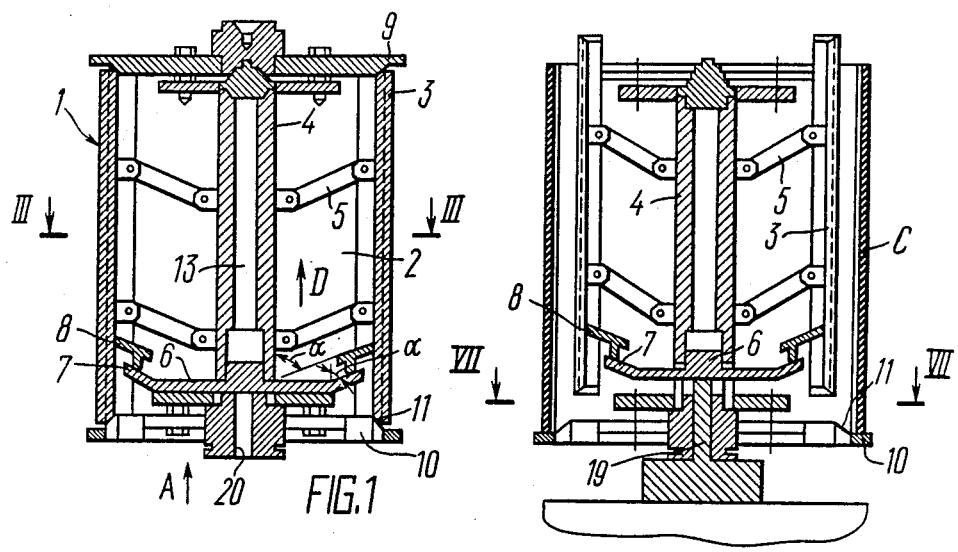
FIG.1
FIG.2
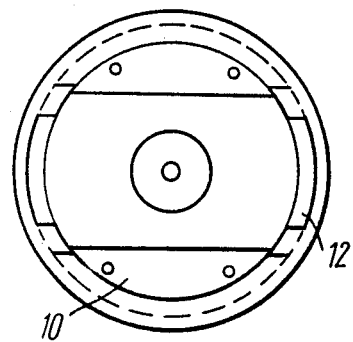
FIG.4
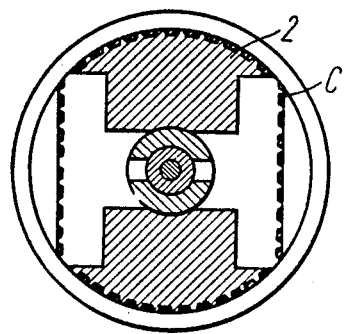
FIG.7

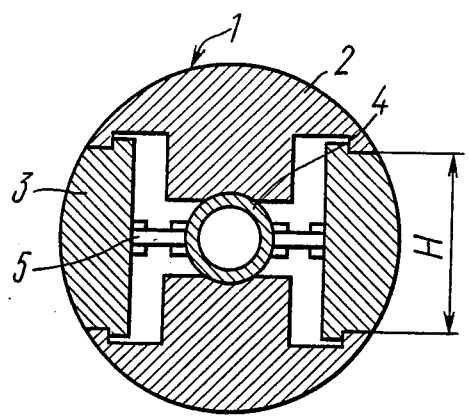
FIG. 3
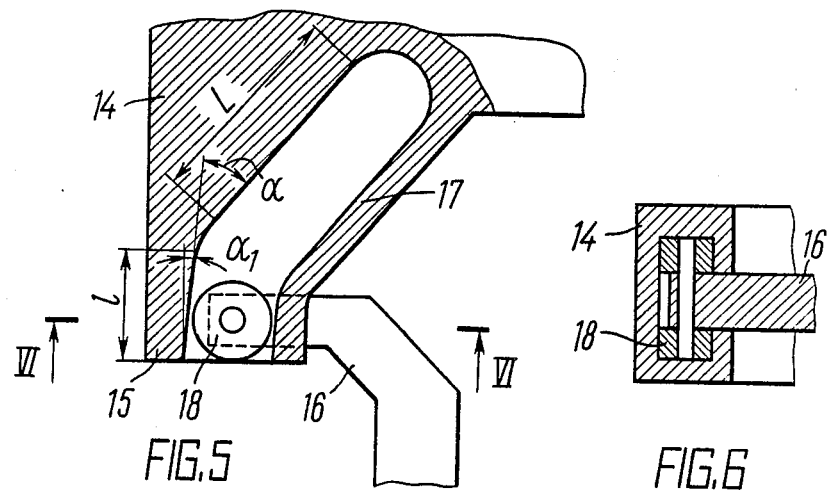
FIG. 5
FIG. 6

DEVICE FOR PRODUCING ANNULAR-SHAPED POLYMER ARTICLES

BACKGROUND OF THE INVENTION

1. Field of the Invention

The present invention relates to devices for producing annular-shaped polymer articles.

2. Description of the Prior Art

Known in the present state of the art is a device for producing polymer articles, comprising a hub and a cylinder-shaped body arranged around the hub, a blank or parison from polymeric materials being set on said cylinder-shaped body, which is made up of a number of sectors, some of which are rigidly coupled to the hub, while other (movable) sectors are associated with the hub through a train of levers enabling the sectors to move radially and axially with respect to the hub. The hub is a tubular structure accommodating an axially traversable pusher having its ends extending beyond the hub limits as far as the stops secured on the movable sectors so as to interact with said stops in order to move said sectors. The pusher ends and the stops are at right angles to the hub axis. The pusher receives motion from a stationary fixed rod which is actuated by a device for stripping a finished annular-shaped article off the body, when the device is let down onto the rod. The cylinder-shaped body is closed from above and from below with detachable lids (cf., e.g., USSR Inventor's Certificate No. 1,087,358 published in the bulletin 'Discoveries, inventions, industrial designs and trade-marks' No. 15, 1984).

A disadvantage inherent in the device discussed above resides in the fact that, owing to the horizontal arrangement of the pusher ends and the stops, a considerable force must be applied to the pusher to separate a finished article from the movable sectors, since said force is directed practically normally to the direction of application of the radial separating force.

SUMMARY OF THE INVENTION

The invention is aimed to provide a device for producing annular-shaped polymer articles, wherein the sectors and the pusher have a construction or arrangement that facilitates stripping of finished annular-shaped articles and extends the processing capabilities of the device.

The object of the invention is accomplished by a device for producing annular-shaped polymer articles, comprising a hub and a cylinder-shaped body arranged round the hub and made up of a number of sectors, some of which being coupled rigidly to the hub, while the other sectors are associated with the hub movably relative thereto, and a pusher arranged in the hub axially therewith and adapted to interact, while traversing, through its ends which extend towards the other sectors, with stops secured on the other sectors in order to move said sectors with respect to the hub. According to the invention, the stops are held to said other sectors at angles less than 90 degrees with the direction of the pusher movement when said other sectors are being brought together.

It is expedient that the pusher ends interacting with the stops be bent out at an angle equal to the angle of the stop inclination.

Such a construction of the pusher increases the radial forces applied to the other movable sectors at the instant when they are stripped from a finished article in response to an axial force applied to the pusher.

It is also expedient that the stop be of a stepped design, the first step, as along the direction of the pusher traverse, be much shorter than the second step, and the angle of inclination of the first step be much less than that of the second step, and that rollers be provided at the pusher ends, adapted to interact with the steps of the stop when the pusher is traversing.

Such a construction of the pusher enables a considerable radial force to be developed at the beginning of the bringing the other (movable) sectors together, necessary for the other sectors to separate from the finished article; it also makes it possible to impart radial movement, when the pusher travels over the second step of the pusher, to the other sectors over a greater length, which is required for a considerable reduction of the perimeter of the device.

It is likewise expedient that the stop be shaped as a slot whose faces interact with the pusher rollers.

Such a construction arrangement of the stops and of the pusher ends enables the sectors to be brought together or apart by virtue of a radial force arising from the pusher movement, which is of special importance in a device for making V-belts.

The device for producing annular-shaped polymer articles, according to the present invention, while being simple in construction arrangement, provides for easy stripping of finished articles and involves much lower forces to be applied to the movable sectors for their bringing together than in similar devices of the heretofore-known constructions.

BRIEF DESCRIPTION OF THE DRAWINGS

In what follows the present invention will now be disclosed in a detailed description of a specific exemplary embodiment thereof with reference to the accompanying drawings, wherein:

FIG. 1 is a general view of a device for producing annular-shaped polymer articles;

FIG. 2 is a view of a device shown in FIG. 1 in a position when a finished article is being stripped off;

FIG. 3 is a section taken along the line III—III in FIG. 1;

FIG. 4 is a view facing an arrow A in FIG. 1;

FIG. 5 is an enlarged cross-sectional view of a stepped-shaped stop in accordance with another embodiment of the invention;

FIG. 6 is a section taken along line VI—VI in FIG. 5; and

FIG. 7 is a section taken along the line VII—VII in FIG. 2.

DESCRIPTION OF THE PREFERRED EMBODIMENT

The device for producing annular-shaped polymer articles comprises a cylinder-shaped body 1 (FIGS. 1, 2) made up of four sectors 2, 3. The opposite sectors 2 (FIG. 3) are rigidly coupled to a hub 4, while the other sectors 3 are traversable with respect to the hub 4 through a toggle-link actuator 5. The hub is a tubular structure, its interior accommodating a pusher 6 (FIG. 1). The pusher 6 has ends 7 located on both pusher sides and extending as far as stops 8 made fast on the other sectors 3 which will hereinafter be referred to as the sectors 3.

The body 1 is closed with a top-end lid 9 and a bottom-end lid 10. The lids 9, 10 have cone-shaped projections engageable with the respective mating shoulders in the sectors 3, thus making it possible to exactly fix the sectors 3 in the brought-apart position.

Recesses 12 (FIG. 4) are provided in the bottom lid 10 in the places where the sectors 3 are located, said recesses being aimed at kicking the finished article 'C' (FIG. 2) upwards without removing the bottom lid 10. The recesses 12 are somewhat narrower than the width H (FIG. 3) of the sectors 3, which is necessary for locking said sectors on the surface of the cone-shaped projection 11 (FIG. 1) of the lid 10.

The stops 8 are secured on the walls of the sectors 3 at angles $\alpha$ to a geometric axis 13 towards the direction 'D' of movement performed by the pusher 6 when the sectors 3 are being brought together, said angles $\alpha$ being less than 90 degrees. The ends 7 of the pusher 6 which interact with the stops 8, are bent out at the angle $\alpha$ equal in magnitude with the angle $\alpha$ of inclination of the stop 8. This feature contributes to building up a considerable radial force applied to the sectors 3 at the instant when the sectors 3 are being separated from the finished article 'C' as a result of an axial force applied to the pusher 6.

To establish a large separating force and provide a longer travel of the sectors 3, a stop 14 (FIG. 5) is made stepped. A first step 15 as along the direction 'D' (FIG. 1) of the motion performed by a pusher 16 (FIG. 5) when the sectors 3 (FIG. 1) are being brought together, has a length 'l' (FIG. 5) which is much less than the length 'L' of a second step 17. The angle $\alpha$ of inclination of the second step 17 towards the direction 'D' (FIG. 1) of movement of the pusher 16 is less than 90 degrees, whereas the angle $\alpha_1$ (FIG. 5) of inclination of the first step 15 is much less than the angle $\alpha$ of inclination of the second step 17.

Rollers 18 are provided at the ends of the pusher 16 and are adapted to interact successively with the steps 15, 17 of the stop 14 when the pusher 16 is radially traversing. While the roller 18 is interacting with the second step 17 of the stop 14 the pusher 16 is made to traverse over a longer distance which is necessary for reducing the perimeter of the body 1 (FIG. 1). In order that the sectors 3 could be not only brought together but also brought apart by virtue of a radial force, it is practicable that the stop 14 (FIG. 6) be shaped as a T-slot whose faces are adapted to interact with the rollers 18 of the pusher 16, a feature that is especially important for devices for producing V-belts, since the production process involves strictly radial movement of the sectors.

The device for producing annular-shaped polymer articles operates as follows.

The device for producing annular-shaped polymer articles with a blank set thereon is forwarded for moulding and vulcanization. After vulcanization the device is knocked down as follows. The top lid 9 is removed, whereupon the device is let down onto a rod 19 (FIG. 2) which runs through an opening 20 (FIG. 1) in the hub 4 and, while acting on the pusher 6, urges it to move axially. The ends 7 of the pusher 6, while interacting with the stops 8, causes the sectors 3 to move. Since the stops 8 and the pusher ends 7 are set at angle less than 90 degrees to the direction 'D' of travel of the pusher 6, a considerable radial force applied to the sectors 3 results from an axial force acting upon the pusher 6, whereby the sectors 3 can be separated from the finished articles 'C'. As a result, the sectors 5 move on the toggle links 5 towards the centre of the device, thus reducing the perimeter of the body 1 and releasing the finished article 'C' as shown in FIG. 7. Then grips are fitted into the recesses 12 of the lid 10 to strip the finished article 'C' from the stationary fixed sectors 2 upwards.

With the stop 14 of a stepped design the forces acting in the course of bringing the sectors 3 together are distributed as follows. When the pusher 16 interacts with the rod 19, the roller 18 first rides over the first step 15 inclined at a small angle $\alpha_1$ towards the direction 'D' of motion of the pusher 16, whereby a considerable radial force is created, necessary for the sectors 3 to separate from the finished article 'C'. When the roller 18 travels over the second step 17, the radial force actuating the sectors 3 is reduced, while the radial travel of the sectors 3 is increased, which makes it possible to significantly decrease the perimeter of the body 1, thus facilitating the stripping of the finished article 'C'.

Provision of the stop 14 as a T-slot interacting with the rollers 18 situated at the ends of the pusher 16, makes it possible to develop a radial force exerted by the pusher 6 on the sectors 3 not only when said sectors are brought together but also when the sectors are set apart in the course of a reverse stroke of the pusher 6. This is of special importance in the devices for making V-belts, wherein a strictly radial force is to be applied and no provision is made for fixing the movable sectors in position by the lids.

Practical tests of the pilot models of the devices for producing toothed or cogged belts, carried out in accordance with the present invention, have demonstrated that the finished articles are stripped easily and practically without the use of any appliances, and can be performed manually by the operator.

It is the weight of the device itself that is sufficient for the sectors to be brought together (self-collapsible mould).

The present invention is reasonable to be applied for making power-transmitting toothed or cogged belts.

The invention is also applicable for making V-belts.

What is claimed is:

1. A device for producing annular-shaped polymeric articles comprising:
   a cylinder-shaped body;
   a hub mounted in said body, said body being made up of sectors including immovable sectors which are rigidly coupled to said hub, and moveable sectors transversely movable with respect to said hub;
   a pusher axially arranged in said hub for movement relative to said hub;
   stops secured on said movable sectors oriented at angles less than 90 degrees to the direction of movement of said pusher, the ends of said pusher extending towards said movable sectors and engaging said stops for transversely moving said movable sectors with respect to said hub, wherein each said stop has a stepped form comprising first and second steps, the first of said steps being in the direction of movement of said pusher during convergence of said movable sectors featuring a length which is much less than the length of the second of said steps, said angle of inclination of the first step of each of said steps being much less than the angle of inclination of said second step, and rollers being provided at said ends of said pusher to cooperate with said steps of said stops in the course of movement of said pusher.

2. A device as claimed in claim 1, wherein each said stop has the form of a slot whose faces interact with said rollers of said pusher.

* * * * *